United States Patent [19]

Jones

[11] 4,128,968
[45] Dec. 12, 1978

[54] OPTICAL SURFACE POLISHER

[75] Inventor: Robert A. Jones, Ridgefield, Conn.

[73] Assignee: The Perkin-Elmer Corporation, Norwalk, Conn.

[21] Appl. No.: 725,382

[22] Filed: Sep. 22, 1976

[51] Int. Cl.$^2$ .............................................. B24C 7/02
[52] U.S. Cl. ......................................... 51/54; 51/119; 51/165.71
[58] Field of Search .................. 51/54, 56 R, 165 R, 51/165.71, 119, 120, 284, 109 R

[56] References Cited

U.S. PATENT DOCUMENTS

| | | | |
|---|---|---|---|
| 1,281,001 | 10/1918 | Hazel | 51/56 |
| 2,909,871 | 10/1959 | Heymes | 51/119 |
| 3,254,454 | 6/1966 | Cetrangolo | 51/56 |
| 3,564,776 | 2/1971 | Aspden | 51/284 X |
| 3,589,078 | 6/1971 | Bala | 51/54 X |
| 3,874,123 | 4/1975 | Hopkins | 51/120 |

Primary Examiner—Gary L. Smith
Attorney, Agent, or Firm—Salvatore A. Giarratana; Francis L. Masselle; John D. Crane

[57] ABSTRACT

An apparatus for precisely polishing an optical surface is described. The apparatus includes polishing pads which are small in size in comparison with the surface being polished. The pads are maintained in contact with and moved across the surface being polished by a pad driver in a manner producing a removal profile which is maximum at the center of pad movement and minimum at the extremes of pad movement. A position drive means is utilized to move the pad drive along a substantially spiraling path centered at the center of the surface being polished and spiraling outward to the parimeter where parallel spiral arcs are spaced a constant distance apart along any given path radius. By controlling the speed of movement along the contour path, the rate of material removal at a particular position on the optical surface is controlled.

21 Claims, 13 Drawing Figures

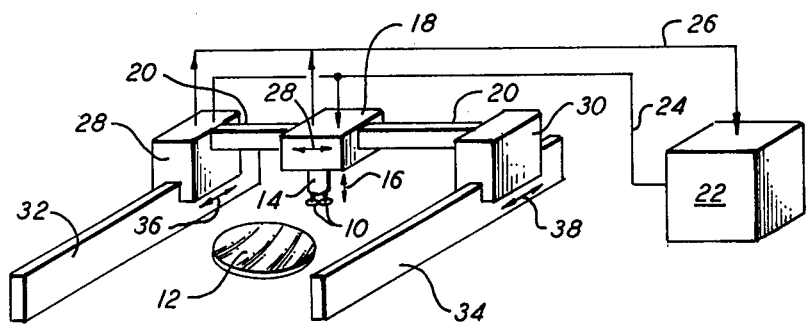
FIG. 1
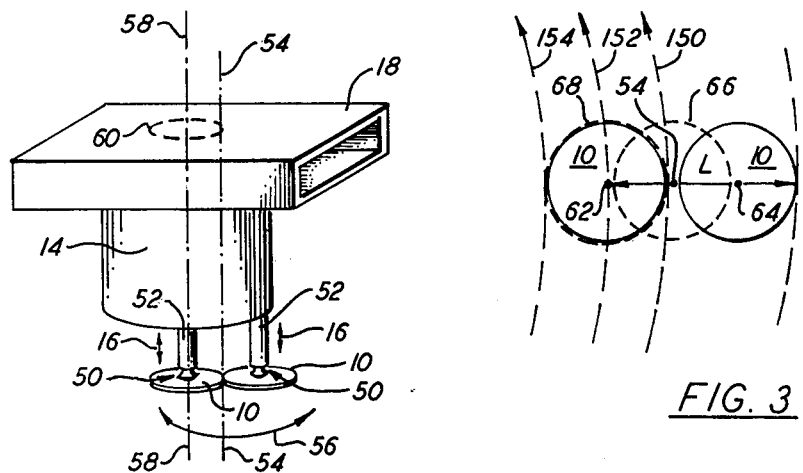
FIG. 2
FIG. 3
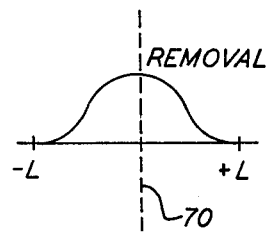
FIG. 4
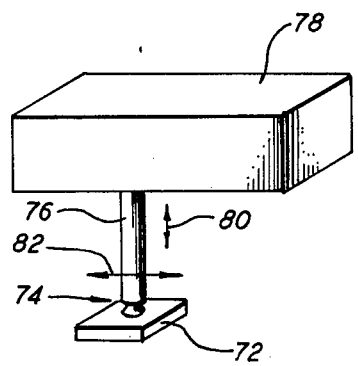
FIG. 5

OPTICAL SURFACE POLISHER

BACKGROUND OF THE INVENTION

The invention relates to polishing optical surfaces such as planar mirrors, spherical mirrors, aspherical mirrors, lenses and the like and more particularly to an apparatus for precisely polishing optical surfaces without manual intervention.

In the field of high precision optics used particularly in scientific optical instruments, telescopes and the like, precise flat surfaces as well as precise curved surfaces must be produced in optical elements to assure the highest possible instrument accuracy. The degree of accuracy required is relatively easily achieved for optical elements which are relatively small in size, however, for an optical element of the size typically used for a mirror in a reflector type telescope, the desired degree of accuracy is not easily obtained. Indeed, the desired optical characteristics for large mirrors used in reflector telescopes is achieved frequently only after years of tedious hand polishing. However, such manual correction is subject to being inaccurate and additionally suffers from being very time consuming. It also tends to produce small wave like variations in the surface contour.

Due to the time and expense of manual polishing, manufacturers have tried to automate the polishing operation with varying degrees of success. One such automated device simply automates the manual approach. Accordingly, measurements of the optical surface are made to locate areas where the contour deviates from that desired. Then, a mechanical polisher is located at the position where additional material must be removed. It is operated for a predetermined time and then moved to another position. These steps are repeated until all areas on the optical surface have been polished where additional material removal is desired. Thereafter, the surface contour is again measured and further polishing steps are performed as necessary. Mirrors made by this approach, however, have not proved to be as precise as desired so that manual polishing is required to make final correction of the surface contour.

Another automated approach involves moving a rotating polishing pad back and forth in a raster pattern across the surface being polished. In this method, the direction of movement of the rotating pad used to polish the surface changes abruptly at the edge of the surface being polished due to the back and forth movement of the pad. As a result, the polishing precision near the surface edge is not easily maintained. Additionally, where the surface being polished is either concave or convex in the direction of pad movement, the pad must be displaced in a vertical direction on each sweep of the pad across the surface. This added vertical pad movement further complicates the polishing process thereby making it more difficult to produce an optical surface having the desired surface contour.

BRIEF DESCRIPTION OF THE INVENTION

In view of the foregoing problems with prior optical surface polishing approaches, it is the primary object of the invention to provide apparatus for automatic polishing of an optical surface wherein the actual surface contour produced therewith more closely conforms to the desired surface contour than achieved by previously known approaches.

It is another object of the invention to automatically and precisely polish an optical surface in less time then required by previously used techniques.

It is another object of the invention to automatically and precisely polish an optical surface wherein the apparatus is suitable for polishing many different surface contours.

It is a further object of the invention to provide apparatus which is suitable for automatic grinding and automatic polishing of optical surfaces.

It is still another object of the invention to provide apparatus for automatically grinding or polishing either planar, spherical, aspherical or other optical surface.

It is yet a further object of the invention to provide an automatic optical surface grinder or polisher which substantially eliminates wave like contour variations of the type produced by manual polishing.

In achieving these and other objects of the invention, the automatic optical surface polisher of the invention has at least one polishing pad which is small in size compared to the size of the surface being polished. More specifically, the maximum pad dimension in a direction parallel to the surface being polished is no greater than 10% of the minimum dimension of the surface being polished. A pad drive mechanism maintains each pad in constant pressure contact with the surface being polished.

The pad drive mechanism is also operative to move the pads while maintaining pad contact with the surface being polished. The path followed by each pad is one which produces a removal profile having maximum material removal at the center of pad movement and a minimum material removal at the extremes of pad movement. In one illustrative embodiment, the pads are moved by a reciprocating movement. In another illustrative embodiment, the pads are moved along an epicyclic path. Either illustrative embodiment produces a material removal profile of the type desired although the actual removal profiles are somewhat different from each other.

The pad drive mechanism is coupled to a position drive mechanism to move the former along a contour path centered at the center of the surface being polished. In an illustrative embodiment of the invention, the position drive mechanism is operative to independently move the pad drive mechanism relative to the surface being polished in two directions substantially perpendicular to each other i.e., in an "X" and a "Y" direction. A control mechanism responds to position sensors on the position drive mechanism and to previously recorded data defining the desired contour path for movement of the pad drive mechanism to calculate the necessary "X" and "Y" velocity to move the pad drive mechanism along the desired contour path. In accordance with the invention, the desired path comprises a contour path centered at the center of the surface being polished where adjacent path segments intersecting any given contour radius are spaced from each other along the radius by a substantially constant distance. It is preferred that the constant spacing be smaller than half the minimum dimension of a pad although other spacings will provide acceptable results.

BRIEF DESCRIPTION OF THE DRAWINGS

The foregoing and other objects, advantages and features of the invention will be described below in greater detail in connection with the drawings wherein:

FIG. 1 is a schematic perspective drawing of one illustrative automated optical surface polisher of the invention;

FIG. 2 is a schematic drawing of the epicyclic pad drive mechansim of the automated polisher of FIG. 1;

FIG. 3 shows the movement imparted to the polishing pads by the pad drive mechanism and the position drive mechanism of the polisher of FIG. 1;

FIG. 4 shows the removal profile achieved by moving the polishing pads in the manner shown in FIG. 3;

FIG. 5 is a schematic drawing of the reciprocating pad drive mechanism which may be used in the automated optical surface polisher of FIG. 1;

DETAILED DESCRIPTION

Figure 6:
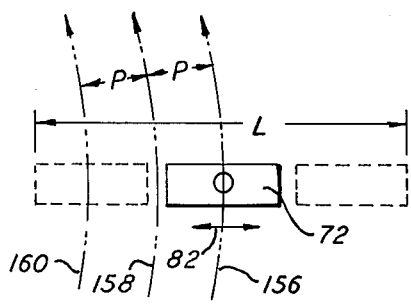
FIG. 6 shows schematicly the pad movement for the mechanism of FIG. 5.

An automated apparatus suitable for optical surface grinding or polishing is shown schematically in FIG. 1. The apparatus includes at least one pad 10 (two being shown) which can be positioned to contract an optical surface 12 which is to be either ground or polished. The pads 10 preferably comprise a circular metal disc or the like to which a material softer than the surface being worked is attached. For grinding, one suitable material is Kemet Iron produced by Engus Corp. which is a composition material softer than glass used for optical elements. For polishing, pitch impregnated felt makes a suitable pad 10. For the illustration in FIG. 1, the optical surface 12 comprises a concave surface such as might typically be used in a reflector type telescope, however, the apparatus of the invention is suitable for both grinding or polishing planar surfaces, spherical surfaces, aspherical surfaces, etc.

The apparatus of FIG. 1 includes means within the housing 14 permitting raising and lowering the pads 10 in a direction as indicated generally by the double headed arrow 16. A mechanism within housing 14 is operative to maintain the pads 10 in a constant pressure contact with the surface 12 during grinding or polishing. Apparatus within the housing 14 is also operative to rotate the pads 10 about a substantially vertical axis.

The housing 14 is disposed on the under side of a travelling drive means 18 which is power driven along a straight beam member 20 under the control of a system controller 22 which couples thereto via a control bus 24 and an input bus 26. The travelling drive means 18 is operative to move back and forth across the beam member 20 in a direction indicated generally by the double headed arrow 28 under the control of the system controller 22. By arbitrary definition, the direction of movement of the travelling drive means 18 back and forth across the beam member 20 is defined as the X direction of movement.

The beam member 20 is secured at opposite ends to additional travelling support means 28 and 30, one of which is powered by an electric motor or the like, which move under the control of the system controller 22 respectively along tracks 32 and 34. The direction of movement of the travelling support means 28 and 30 is respectively shown by the double headed arrows 36 and 38 which are disposed in perpendicular relation to double headed arrow 28. Accordingly, the direction indicated by the double headed arrows 36 and 38 is defined to be the Y direction.

According to the principals of the present invention, the apparatus of FIG. 1 is operative for both grinding as well as polishing an optical surface 12. In performing such grinding and polishing operations, the system controller 22 is operative to position the travelling drive means 18 and the travelling support means 28 and 30 so that the pads 10 are positioned over the surface 12. The pads 10 are then allowed to contact with the surface 12. During grinding operations, a grinding compound is placed on the surface 12 and the pads 10, in contact with the surface 12, are moved by the system controller 22 across the surface 12 in a manner described hereinafter in greater detail to remove material from the surface 12 thereby changing its surface contour. During polishing operations, the apparatus of FIG. 1 is also operative to drive the pads 10 across and in pressure contact with the surface 12 in the same manner as hereinafter described in greater detail. The pads and the grinding or polishing compound are selected in a manner well known in optical surface grinding or polishing to remove only a small amount of material from the surface 12 each time a pad moves across a given area on the surface gradually smoothing it until it is within a very small maximum deviation of the desired surface contour.

As will become more apparent later, the system of FIG. 1 includes in the travelling drive means 18 and the travelling support means 28 respectively an X position sensing and a Y position sensing means which transmits information over the input bus 26 to the system controller 22. This information is utilized by the controller 22 so as to move the pads 10 across the surface 12 along a desired path. The position sensing means in the travelling drive means 18 and the travelling support 28 are utilized in a manner described in greater detail later to allow the system controller 22 to dynamically correct the pad 10 movement path so as to follow a desired contour path thereby preventing cumulative position errors from adversely affecting the X and Y positioning of the pads 10 relative to the surface 12.

Referring now to FIG. 2, an apparatus for imparting epicyclic motion to the pads 10 is shown. As indicated earlier, the pads 10 are maintained in pressure contact with the surface being polished or ground. To facilitate this, each of the pads 10 are supported by a ball and socket arrangement indicated generally at 50 disposed at the lowermost end of a vertically displaceable shaft 52. The ball and socket 50 coupling for the pads 10 to the shaft 52 permits the plane of the pads 10 to be disposed parallel to the surface being polished be it a planar or a curved surface.

During polishing or grinding, the pads 10 are forced downwardly by a mechanism within the housing 14 so as to provide constant pressure contact of the pads 10 with the surface 12. When the apparatus is neither polishing nor grinding the mechanism within the housing 14 for forcing the pads 10 into contact with the surface 12 is disabled so that shafts 52 can be displaced vertically by hand.

Many suitable mechanisms are available for forcing the pads 10 into constant pressure contact with the surface 12 being polished. One such apparatus includes a rack and pinion drive coupled to each shaft 52 with means for maintaining a constant torque on the pinion so as to maintain the pad 10 located at the lowermost end of each shaft 52 in constant pressure contact with the surface being polished. Another suitable mechanism 308 includes either an air or a hydraulic cylinder coupled to each shaft 52 wherein a constant pressure is maintained on the cylinder piston thereby maintaining the pad 10 in constant pressure contact with the surface being polished. Other equivalent apparatus for maintaining the pads in constant pressure contact with the surface may be utilized.

The pads 10 preferably have a diameter that is less than 10% of the minimum dimension of the surface being polished as this has proved to enhance the grinding and polishing ability of the system. The pads 10 are mounted so they do not contact each other and are rotated about a substantially vertically disposed axis 54 in a direction indicated generally by the double headed arrow 56 by a pad drive means located within the housing 14. One suitable mechanism for rotating the pads 10 about axis 54 includes a mounting plate 300 for supporting the pad supporting mechanism wherein the mounting plate 300 is rotatable about axis 54 by a suitable drive 302 such as an electric motor or the mechanism shown for the same purpose in U.S. Pat. No. 1,281,001.

The apparatus in FIG. 2 includes a further mechanism within housing 14 for rotating the assembly which produces rotary movement of the pads 10 about the axis 54. This further mechanism rotates axis 54 about a second substantially vertical axis 58. For the pad 10 position in FIG. 2, the axis 58 substantially corresponds to the support axis passing through the leftmost shaft 52 which supports the leftmost pad 10. This further mechanism rotates the axis 54 about the axis 58 along a path indicated by the dotted circle 60. Accordingly, the pads 10 rotate about the axis 54 which itself is rotated about the axis 58 thereby imparting epicyclic motion to the pads 10. A suitable drive means for rotating the axis 54 about the axis 58 includes a second mounting plate 304 for supporting the mechanism which drives the pads 10 in rotary motion about the axis 54 where the second mounting plate itself is driven in motion about the axis 58 by a suitable drive means 306 such as a motor. Those of skill in the art, however, will readily recognize that numerous other equivalent drives may be utilized to move the pads 10 in the desired epicyclic motion.

The epicyclic motion of the pads 10 is shown schematically in FIG. 3. The pads 10 whose centers are shown at 62 and 64 are rotated by the pad drive means according to the invention about an axis disposed perpendicular to the page of FIG. 3 and passing through the dot labelled 54 and corresponds to the axis 54. Accordingly, the centers 62 and 64 of the pads 10 are driven along a circular path indicated by the dotted circular line 66. In addition, the mechanism for rotating the pads about the axis 54 itself is rotated about an axis passing through the center 62 and disposed perpendicularly to the sheet on which FIG. 3 is drawn. Accordingly, the vertical axis 54 is rotated about the axis passing through the center 62 along a circular dotted line 68 which means that the circular path 66 defining the path of the centers of pads 10 is itself rotated about the axis passing through the center 62. In this manner, the pads 10 are moved over a circular area on the surface being either ground or polished centered at a point coincident with the axis passing through the center 62 and having a radius L.

If the housing 14 per se were to remain in a fixed positional relationship with respect to the surface being polished, the apparatus within the housing 14 functions to provide a removal profile taken across a diameter of the circular area polished thereby which looks substantially like that shown in FIG. 4. The epicyclic motion imparted to the pads 10 will cause a maximum material removal to occur at a point coincident with the axis 58 in FIG. 2 and passing through the center 62 in FIG. 3 as indicated by the peak of the removal pattern intersecting the vertical line 70 in FIG. 4. As one travels in either direction from the line 70, the material removal caused by the epicyclic motion of the pads 10 gradually decreases until it becomes substantially zero at the extremes of the pad 10 movement which is a distance L on either side of the vertical dotted line 70. Accordingly, the epicyclic motion imparted to the pads 10 by the pad drive means enclosed within the housing 14 is operative to produce a removal profile having peak removal at the center of pad movement and minimum removal at the extremes of pad movement.

An alternative mechanism for producing a removal pattern similar to that shown in FIG. 4 is shown in FIG. 5. This mechanism includes a pad 72 coupled diagramatically by a ball and socket arrangement shown generally at 74 to a vertically reciprocatable shaft 76. The ball and socket coupling 74 is operative to permit the pad 72 to tilt with respect to the shaft 76 so as to be in contact with the optical surface being polished regardless of whether the surface is planar or curved.

Pad 72 is moved into contact with a surface being polished by a mechanism located within housing 78 which is operable to extend the shaft 76 in a direction indicated generally by the double-headed arrow 80. The extending mechanism within the housing 78 preferably is operative to maintain a constant pressure contact with the pad 72 and the surface being polished. Suitable mechanisms for extending the shaft 76 were previously described with reference to FIG. 2 and these mechanisms are suitable for the apparatus of FIG. 5 as well.

Figure 7:
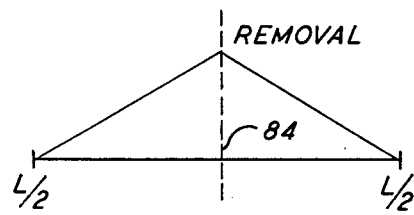
FIG. 7 shows the removal pattern achieved with the mechanism of FIG. 5.

The pad 72 is moved relative to the housing 78 in a reciprocating manner in a direction indicated by the double-headed arrow 82. Any drive means suitable for providing reciprocating motion is suitable for this application. Accordingly, the pad 72 is reciprocated back and forth in a direction indicated by the double-headed arrow 82 over a total distance L indicated in FIG. 6. This reciprocating movement of the pad 72 produces a removal profile such as shown in FIG. 7 which has a peak removal disposed along the vertical dotted line 84 which corresponds to the center of reciprocating movement in a minimum removal at a distance L/2 either side of the dotted line 84 each of which correspond to the extremes of pad movement. Because the path of movement for the pad 72 imparted by the apparatus of FIG. 5 is a reciprocating straight line, the removal profile developed thereby is essentially triangular as indicated in FIG. 7, however, peak removal occurs at the center of pad movement and minimum removal occurs at the extreme of pad movement.

In accordance with the present invention, it has been found that removal profiles such as those produced by the apparatus shown in FIGS. 2 and 5 are highly desirable in automated machines for either grinding or polishing optical surfaces. Accordingly, any mechanism which will produce a removal profile substantially similar to those shown in FIG. 4 or 7, i.e., those removal profiles having a maximum removal at the center of pad movement and a minimum of removal at the extremes of pad movement, may be utilized in the system of FIG. 1 with highly advantageous results.

The apparatus described in connection with FIGS. 2–7 is operative to move pads over a limited portion of the surface to be polished. This apparatus is then supported for movement on the beam 20 in FIG. 1 so that the whole assembly within housing 14 can be moved relative to the surface being polished 12 by the travelling drive means 18 and the travelling support 28 under control of the system controller 22.

Figure 8:
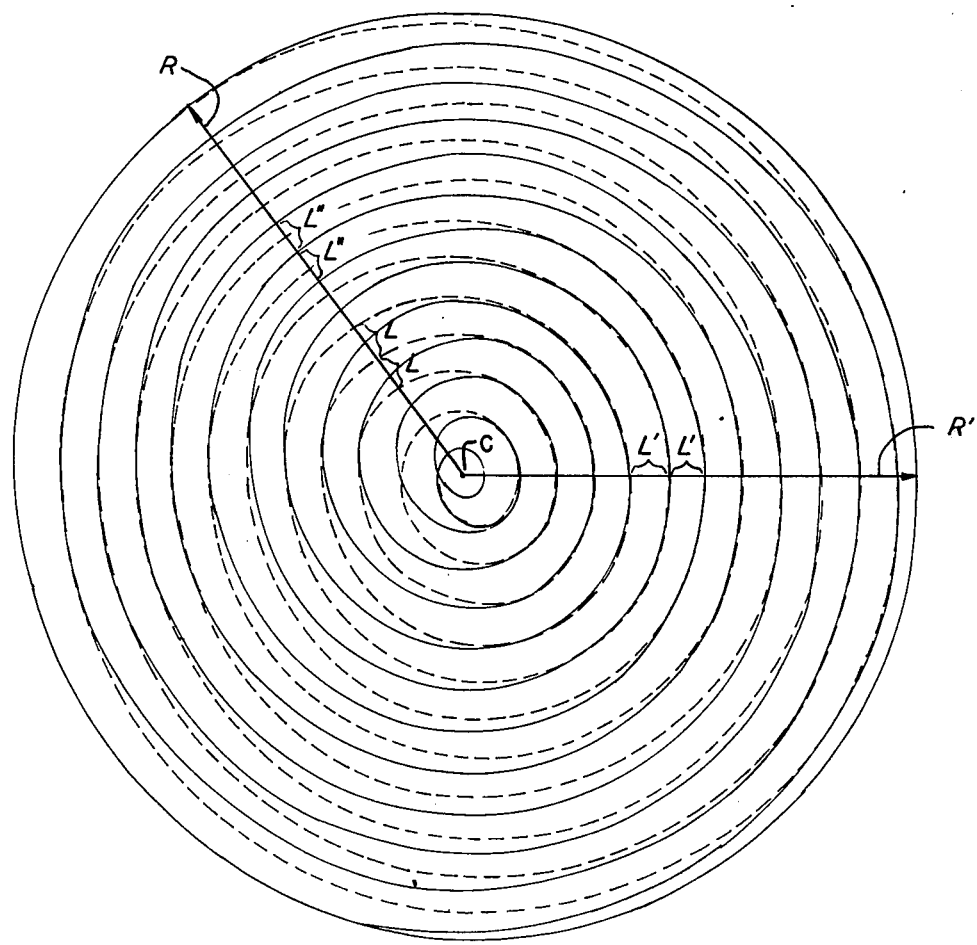
FIG. 8 shows the contour path followed by the pad drive mechanism under power of the position drive mechanism of FIG. 1 when polishing a circular surface.

It has been found that the most desirable path for movement of the mechanism within the housing 14 comprises a contour path centered at the center of the surface being polished wherein adjacent path segments intersecting a given contour radius are spaced a constant distance apart. For a circular optical element, the contour path comprises a spiral such as is shown in FIG. 8 wherein the center of the circular surface is located at the center C and the perimeter of the surface is located a distance R (or R') from the center C. The contour path shown in FIG. 8 is the path which spirals out from the center C to the perimeter and then spirals in from the perimeter to the center C and is followed by the apparatus of FIG. 2. This path coincides with the movement path over which the center of movement of the pads 10 travels.

The unique characteristic of the contour path of FIG. 8, as indicated above, is that adjacent path segments intersecting a given spiral radius are spaced from each other by a constant distance. For example, along the radius R for the spiralling out path when traversed in a clockwise direction, adjacent path segments intersecting radius R are always spaced apart by a distance indicated by the brackets labelled L''. In a similar manner when spiralling in, in a clockwise direction, adjacent contour path segments intersect the contour R at a constant distance apart L which is also constant and equal to the distance L''. The constant distance between adjacent contour path segments intersecting a given spiral radius is maintained on each radius across the entire surface being polished except at the perimeter where the pad movement traverses the perimeter of the surface being polished.

For other shaped optical elements, the contour path ideally intersects along any given radius at a constant distance apart. For oval elements, the path is a spiral quite similar to that of FIG. 8 however it is distorted along the major and minor element axes. For other irregular optical element shapes, a center is located and a contour path is defined which is similar to a spiral with the outermost portion of the path being disposed generally in spaced relation to the perimeter of the optical element. The contour path coils inwardly in a manner so that adjacent path segments intersect any given contour path radius extending from the center to the element perimeter at a constant distance from each other.

In normal operation of the system of FIG. 1, the system controller 22 is operative to start with the center of pad movement disposed either at the center of the surface being polished or at the perimeter. Thereafter, the pads are moved about the center of pad movement by the mechanism within the housing 14 and the travelling drive means 18 and the travelling support means 28 are operative to move this mechanism so that the center of pad movement traverses a contour path such as shown in FIG. 8 and, for example, may spiral from the center to the perimeter and back to the center or may spiral from the perimeter to the center and back to the perimeter. The system controller may even cause the mechanism in housing 14 to traverse the contour path from center to perimeter and back to the center several times. The pads contacting the surface being polished, however, are continuously moved relative to the contour path by the apparatus within the housing 14 as the housing traverses the contour path.

The system controller 22 of FIG. 1 is operative to cause the travelling drive means 18 and the travelling support means 28 to move the housing 14 simultaneously in the X and Y direction so as to cause the axis 58 corresponding to the center of pad movement to follow a contour path such as that shown in FIG. 8 over the surface 12 being either ground or polished. Ideally, the contour path itself has adjacent path segments intersecting a given contour path radius which are spaced from each other by a constant distance. However, since the drive means of FIG. 1 is a rectilinear drive both in the X and Y direction, it is most easily adapted to moving the pad drive means relative to the surface being polished along straight lines. Accordingly, the system controller 22 is operative to control the movement of the travelling drive means 18 and travelling support means 28 along a plurality of straight line segments each being relatively short so as to produce a path substantially approximating that of the desired contour path. Typically, for a spiral contour path such as that shown in FIG. 8, the controller 22 is operative to move the pad drive means along many thousand straight line segments which substantially approximate a smooth spiral path.

Figure 9:
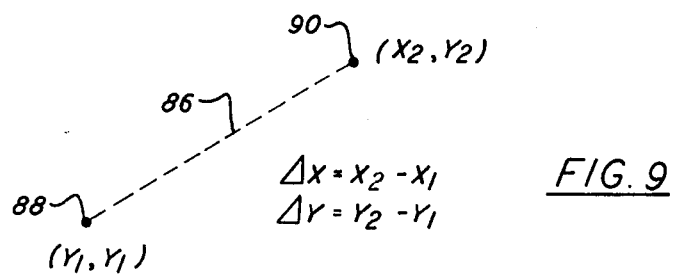
FIG. 9 shows two points along any contour path.

A typical segment for any contour path is shown in FIG. 9 where the travelling drive means 18 and the travelling support 28 are operative to cause the axis passing through the center of pad movement as provided by the pad drive means to travel along the dotted line 86 between the point 88 and the point 90. In a typical operation of the apparatus according to the invention, the distance between point 88 and 90 normally is in the range between 10 and 25 mm. However, the system will perform satisfactorily with path segments both significantly larger as well as smaller than the extremes of this typical range. In traversing a contour path segment such as that shown in FIG. 9, the system controller 22 is operative to drive the travelling drive means 18 and the travelling support means 28 at a constant X and Y velocity so that the center of pad movement travels from point 88 to point 90 in the desired time. To do this, controller 22, senses that it is at a position having coordinates $X_1$ and $Y_1$ via the position sensing mechanism respectively within the travelling drive means 18 and the travelling support means 28. This position information is transmitted over the input bus 26 to the controller 22. The system controller 22 then fetches from a data storage means such as a magnetic tape, a card or magnetic storage the coordinates of the next point 90 on the spiral path designated as $X_2$ and $Y_2$. The controller 22 then calculates the X and the Y distance between the points 88 and 90 which respectively correspond to $X_2-X_1$ and $Y_2-Y_1$. At the same time that the coordinates of the next point on the contour path is removed by the controller 22 from its storage, an indication is removed from storage which corresponds to the time desired for traversing from point 88 to point 90. This time T is then divided into the X distance between points 88 and 90 to calculate an X velocity. Likewise, the time T is divided into the Y distance between points 88 and 90 to calculate a Y velocity. The X and Y velocities are transmitted over the control bus 24 respectively to the travelling drive means 18 and the travelling support means 28 which respectively respond thereto to drive the travelling drive means 18 along the beam member 20 at the X velocity and drive the travelling support means 28 along the track 32 at the Y velocity.

At the beginning of the traversal along a segment 86, the controller 22 starts a timer which is continually compared with the time T desired for traversing from point 88 to point 90. As a check on actual system operation, if the timer should reach a value equal to T, the controller is operative to fetch the information corresponding to the next point on the contour path and the time T traversing the next segment. A new X and Y velocity is calculated based on the current position, the next position along the contour path and the new time T.

At the same time that the mechanism begins traversing a segment 86, the controller 22 determines whether the X or Y distance between points 88 and 90 is the greatest. Thereafter, the controller 22 monitors the coordinate position of the assembly to determine whether it has traversed a distance corresponding to the greater of the magnitudes of the X or Y distance between points 88 and 90. When this greater distance is traversed, the controller 22 is operative to fetch the coordinates of the next point along the spiral path and the process is repeated.

Figure 11:
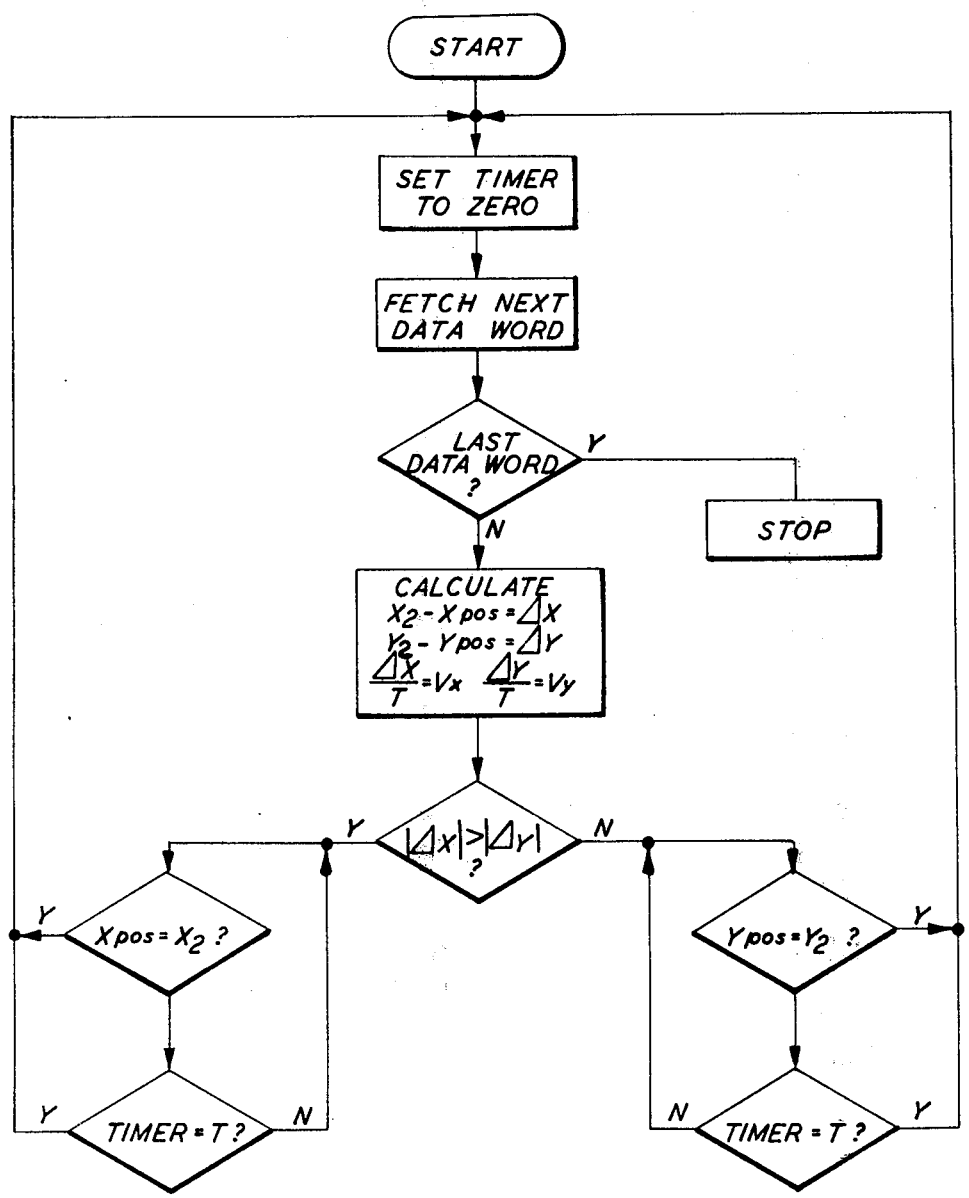
FIG. 11 is a flow chart of the operations performed by the circuit of FIG. 10.
Figure 10:
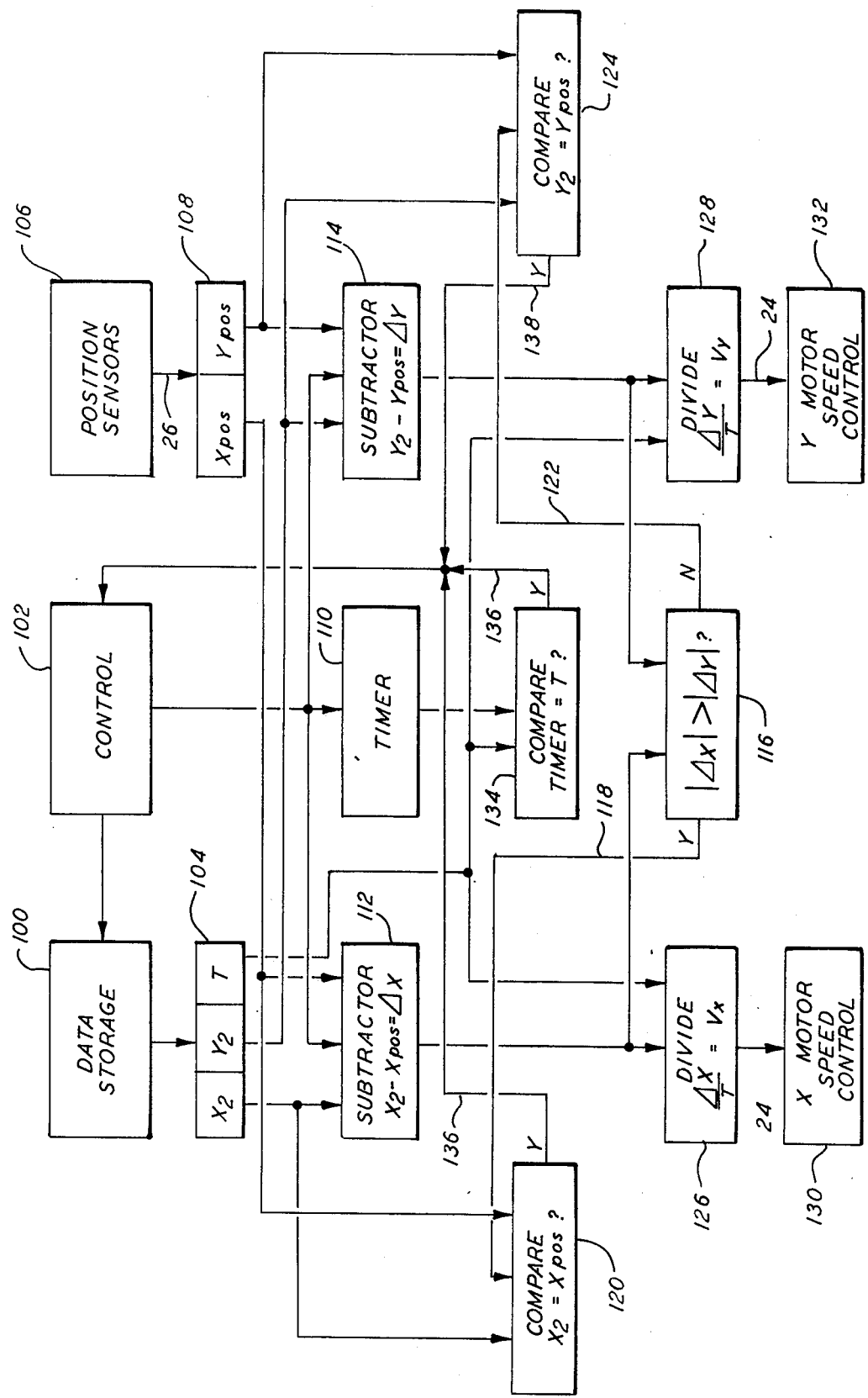
FIG. 10 shows a control circuit for controlling the position drive mechanism of FIG. 1.

The method described briefly above for the controller 22 is shown in greater detail in the flow chart of FIG. 11 which describes the method of operation for the controller apparatus shown in FIG. 10 which corresponds to the apparatus for performing the above briefly described operation. The controller of FIG. 10 contains a data storage 100 which stores a plurality of data words each comprising the X and Y coordinate of a point along the desired contour path and a time corresponding to the time desired to traverse between the previous point on the contour path and the point defined by the coordinates located in the same word as the particular time T. Each such data word is extracted from the data storage 100 under control of the control unit 102 and placed in a register 104 which has portions reserved for the X coordinate ($X_2$), the Y coordinate ($Y_2$) and the time (T).

The controller of FIG. 10 is coupled by the control bus 26 to position sensors 106, one suitable sensor being shown in U.S. Pat. No. 3,589,078, located on the travelling drive means 18 and the travelling support means 28 which continually transmit to the controller the current position coordinate. The current position coordinates are clocked at a periodic rate into a current position register 108 which has a dedicated portion for the current X coordinate ($X_{pos}$) and a current Y coordinate ($Y_{pos}$).

At the beginning of the traversal of a path segment such as 86 of FIG. 9, the control module 102 in FIG. 10 is operative to zero a timer and fetch from data storage 100 the data word corresponding to the coordinates of the next point along the contour path and the time corresponding to that required to traverse from the present position to the next contour path position. Thereafter, the control 102 conditions a subtractor 112 to calculate the X coordinate difference between the current position and the next contour path position, i.e., to calculate $X_2 - X_{pos} = \Delta X$. Simultaneously, the control 102 is operative to actuate a second subtractor 114 which calculates the Y coordinate difference between the current position and the Y coordinate of the next position along the contour path, i.e., to calculate $Y_2 - Y_{pos} = \Delta Y$.

After $\Delta X$ and $\Delta Y$ have been calculated, a magnitude comparator circuit 116 determines whether the magnitude of $\Delta X$ is greater than the magnitude of $\Delta Y$. If the magnitude of $\Delta X$ is greater than the magnitude of $\Delta Y$, a signal is transmitted over the line 118 to actuate a comparator circuit 120 which is operative to compare whether the current position $X_{pos}$ is equal to the X coordinate $X_2$ of the next position on the contour path. On the other hand, if the comparator 116 determines that the magnitude of $\Delta X$ is less than the magnitude of $\Delta Y$, a signal is transmitted over the line 122 to a further comparator 124 which is operative to determine whether the current Y position $Y_{pos}$ is equal to the Y coordinate $Y_2$ of the next position on the contour path. At the same time, divide circuits 126 and 128 are actuated to respectively determine the X velocity $V_x$ and the Y velocity $V_y$ which is to be transmitted over the control bus 24 respectively to the X motor speed control 130 located on the travelling drive means 18 and the Y motor speed control 132 located on the travelling support means 28. The X velocity is calculated by dividing $\Delta X$ by T and the Y velocity is calculated by dividing $\Delta Y$ by T.

As the system is operative to cause the pad drive means within housing 14 to traverse from the current position to the next position on the contour path, comparator circuit 134 is continually operative to determine whether the continually updating timer 110 is equal to the value T stored in Register 104. Simultaneously, either comparator circuit 120 or comparator circuit 124 is operative to determine whether a distance has been traversed corresponding to the greater coordinate difference between the starting and ending point along a path segment has been traversed. Should compare circuit 120 be operative and should it determine that the current position $X_{pos}$ is identical to the X coordinate $X_2$ of the next point on the contour path, a signal is transmitted over the line 136 back to the controller 102 which causes the latter to fetch the next data word from the data storage 100 corresponding to the next coordinate position along the contour path and the process of calculating a new X and Y velocity begins again.

In a similar fashion, the compare circuit 134 continually operates to determine whether the timer is identical to the time in the register 104. Should it determine an equality, a signal is transmitted over the line 136 back to the control 102 which causes the next coordinate position along the contour path to be fetched from the data storage 100.

On the other hand, if the compare circuit 124 is operative as opposed to compare circuit 120, this circuit is operative to determine whether the current Y coordinate $Y_{pos}$ is equal to the Y coordinate $Y_2$ of the next position along the contour path. If an identity is determined by the compare circuit 124, a signal is transmitted via line 138 to the control 102 which is operative to fetch the next data word from storage 100 which corresponds to the coordinates of the next position along the contour path and the time required to traverse from the present position to that next position.

While three separate conditions may be produced by the circuitry of FIG. 10 for causing the control 102 to fetch the next data word from storage 100, the system is operative so that only one such condition will cause the control 102 to fetch the next word from storage 100. This is accomplished in part by the fact that only one of the compare circuits 120 or 124 is operative at a given time as a consequence of deciding whether /Δ X/ is greater than /Δ Y/ as described earlier and by the fact that the control 102 is operative to respond to the first compare equal indication from compare circuits 120, 124 or 134 to fetch the next data word and will not respond to any further requests for the next data word until after a new X and Y velocity has been calculated. Accordingly, the control circuitry shown in FIG. 10 is operative to perform the functions defined in the flow chart of FIG. 11 and, therefore, the pad drive means within the housing 14 is moved along a contour path whose coordinates are defined by the data located within the storage 100. The coordinate data in the storage is selected so that adjacent contour segments intersecting any given contour radius extending from the center to the edge of a surface being polished are substantially equidistant from each other. The maximum distance between any two such segments intersecting any given contour radius is preferably less than half the maximum pad dimension. As such, adjacent path segments such as 150, 152 and 154 of FIG. 3 and 156, 158 and 160 of FIG. 6 are close enough together that the pad movement about its center disposed along one such segment overlap several other segments. This overlapping permits more even material removal over the surface being polished thereby producing a surface contour which very closely conforms to the desired surface contour.

Summarizing the description of the invention to this point, the automated optical surface grinder or polisher of FIG. 1 as further described in connection with FIGS. 2-11, has polishing pads having a maximum dimension in a direction substantially parallel to the surface being polished which is no greater than 10% of the minimum dimension of the surface being polished. In addition, a pad drive means is provided to maintain contact between the pad and an optical surface to be polished and the pad is moved thereby so as to produce a removal profile having peak removal at the center of pad movement and minimum removal at the extremes of pad movement. In addition, the pad drive means is moved relative to the surface being polished by a positional drive mechanism so that the pad drive means traverses a contour path having adjacent path segments intersecting any given contour path radius from the center to the edge of the surface being polished or ground which are spaced along that radius at a constant distance. In one experimental use of the apparatus according to the invention, the apparatus was used to produce a 15 inch diameter Cervit piece with an optical path difference from the desired flat surface of 1/80 wave RMS where the wavelength is 0.6328 micrometers. Similar highly accurate results have been obtained on curved surfaces as well.

Figure 12:
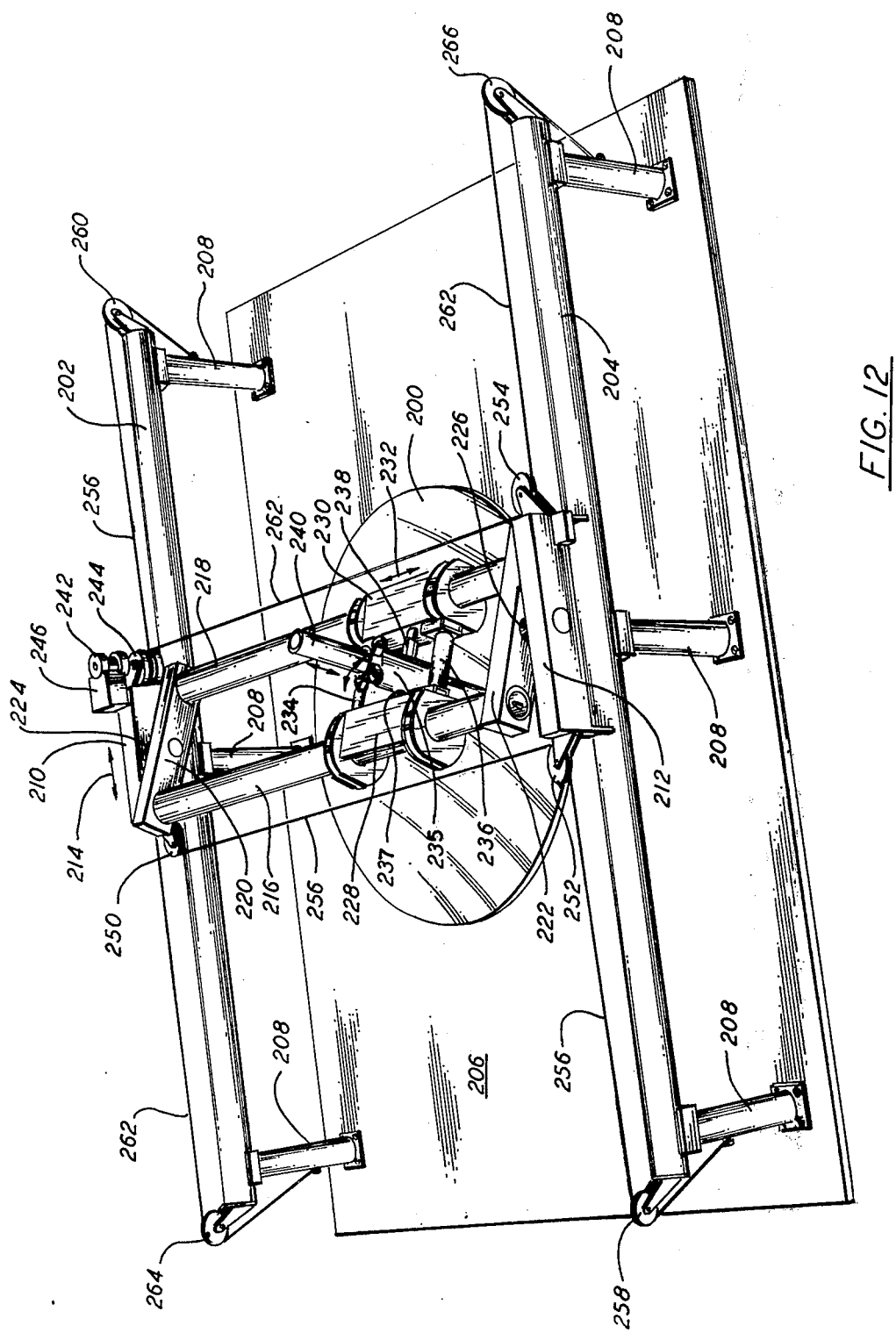
FIG. 12 is a perspective drawing of an alternative optical surface polisher according to the invention.
Figure 13:
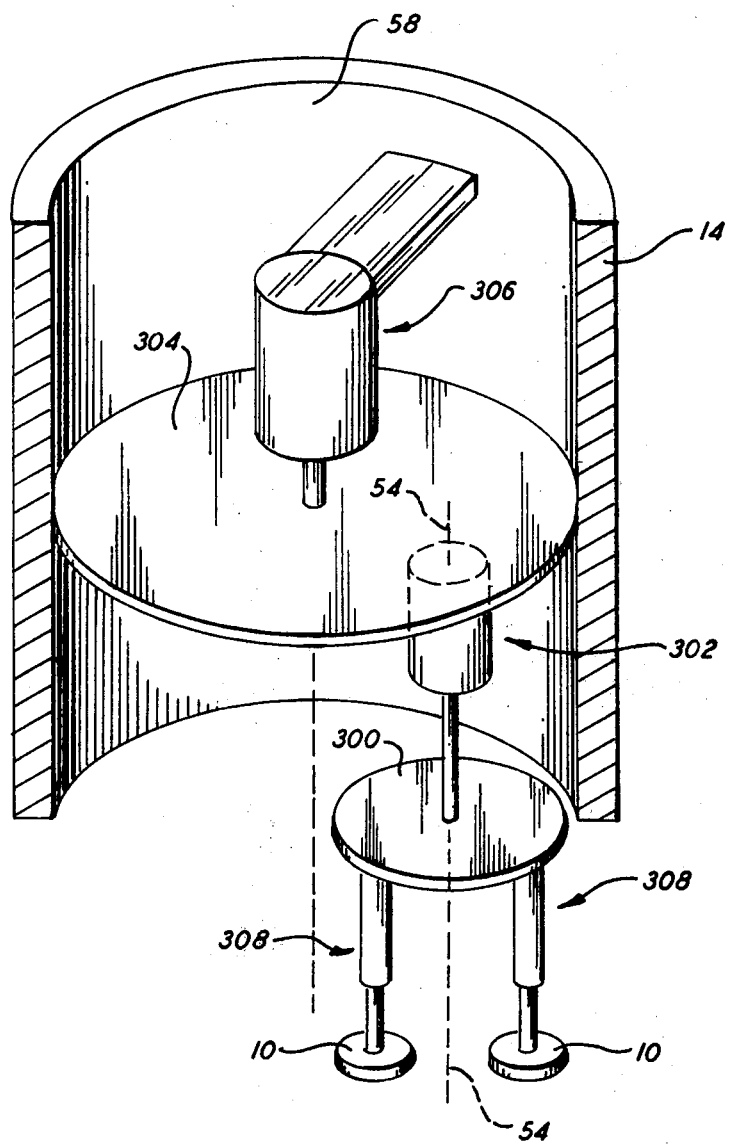
FIG. 13 is a schematic perspective drawing of the apparatus within housing 14.

Referring now to FIG. 12, an alternative optical surface polisher in accordance with the invention is shown. This embodiment is especially useful in either grinding or polishing large optical surfaces which are deeply concave and particularly to concave optical surfaces which are so deep that the ball and socket connection between the pads 10 and the shafts 52 of FIG. 2 cannot be utilized to position the pads 10 substantially in flat contact with the deeply concave surface. The configuration of FIG. 12, however, adds a further motion to the assembly for supporting a housing such as 14 in FIG. 2, permitting the pads supported thereby to be disposed in substantially flat contact with the concave surface being ground or polished.

The arrangement in FIG. 12 has a large, circular, highly concave optical piece 200 whose upper surface is to be ground and polished to have a contour substantially corresponding to a previously decided configuration. The arrangement of FIG. 12 may also be used with optical pieces having other shapes such as flat or convex surfaces. The optical piece 200 is disposed between two parallel horizontally disposed support members 202 and 204 which are cylindrical in shape and supported above the floor 206 of the facility housing the assembly of FIG. 12 on a plurality of support posts 208 each being substantially the same height so as to position the support members 202 and 204 in parallel relation to each other and parallel to the floor 206. The support members 202 and 204 may have any other shape suitable for supporting the remainder of the assembly described below.

Disposed from longitudinal movement along each of the support members 202 and 204 respectively are travelling supports 210 and 212 having rollers or the like permitting the travelling supports 210 and 212 to move back and forth across the support members 202 and 204 in a direction generally indicated by the double-headed arrow 214.

Disposed between the two travelling supports 210 and 212 is a transverse support mechanism including two elongated, cylindrically shaped, transverse support members 216 and 218 each being supported at opposite ends by end support members 220 and 222 which are respectively pivoted about trunnions 224 and 226 interconnecting said end support members 220 and 222 respectively with said travelling supports 210 and 212. Accordingly, the assembly including the transverse support members 216 and 218, the end support members 220 and 222 and the trunnions 224 and 226 are pivotable about an axis passing directly through the two trunnions 224 and 226.

Disposed for longitudinal movement on the two transverse support members 216 and 218 are respectively two travelling transverse supports 228 and 230 which are movable back and forth in a direction indicated generally by the double-headed arrow 232. The two travelling transverse support members 228 and 230 are rididly joined by spanners 234 and 236 so that the longitudinal position along either of the transverse support members 216 and 218 of the travelling transverse support members 228 and 230 is the same. In addition, the travelling transverse support members 216 and 218 are mounted in a manner preventing their falling from or being dislodged from the transverse support members 216 and 218 regardless of the amount that they are pivoted about the axis through the two trunnions 224 and 226.

Disposed between the two travelling transverse support members 228 and 230 is a telescoping assembly including an outer member 235 pivotally connected by two trunnions 237 and 238 respectively to the travelling support members 228 and 230. Disposed for telescopic motion within the outer member 235 is an inner member 240. A housing such as 14 of FIG. 2 is supported in a conventional manner though unshown at the lowermost end of the member 240. The mechanism within the housing 14 moves pads 10 in a manner described earlier. Accordingly, the upper surface of the optical piece 200 is contacted by at least two pads such as pads 10 of FIG. 2 thereby permitting it to be either ground or polished depending on the type of compound utilized.

As indicated generally above, the invention comprises apparatus for automatically grinding or polishing an optical surface such as the upper surface of optical piece 200 according to the invention. Accordingly, the apparatus of FIG. 12 includes a plurality of controllable motors or the like which are operative to move the head or housing of the type described earlier in connection with FIG. 2 and disposed at the lowermost end of the inner member 240, relative to the upper surface of the optical piece 200. The first movement of the head is arbitrarily defined as being in the "X" direction which is substantially as indicated by the double-headed arrow 214. The mechanism for providing X movement of the assembly of FIG. 12 includes a motor 242 or any other suitable controllable rotary drive coupled to a cable drive cylinder 244 which is disposed for rotation about a vertical axis. The motor 242 is secured via a support member 246 which is attached to the travelling support 210. In addition, the travelling support member 210 has a pulley 250 disposed for rotation about a vertical axis at the leftmost end thereof. Two additional pulleys 252 and 254 are mounted on the travelling support 212 respectively on the leftmost and rightmost end thereof, each pulley 252 and 254 being disposed for rotation about a vertical axis. A cable 256 anchored at one end to a post 208 first passes over a pulley or other support 258 and then passes respectively through pulleys 252 and 250 thereafter wrapping around the cable drive cylinder 244 at least once and then over another pulley or support 260 to be anchored at its other end to a support post 208. A second cable 262 is attached at one end to a post 208. The cable 262 then passes over a pulley or other support 264 thereafter wrapping at least once around the drive cylinder 244. Thereafter, the cable 262 passes through the pulley 254 and over a pulley or support 266 to be anchored at its other end to another post 208.

In operation, the travelling supports 210 and 212 are moved back and forth in a direction indicated by the double-headed arrow 214 under power of the motor 242 which, in accordance with the present invention, is coupled by a data bus to a controller such as the system controller 22 of FIG. 1. As the shaft of the motor 242 is turned, the cable drive cylinder 244 rotates thereby causing the cables 256 and 262 to be wound therearound causing the travelling supports 210 and 212 to move along the support members 202 and 204. Accordingly, the "X" position of the assembly disposed between the travelling supports 210 and 212 is controlled by the motor 242.

As indicated earlier, the end support members 220 and 222 are pivotable about the trunnions 224 and 226. A motor or the like coupling between one travelling support 210, 212 and respectively the immediately adjacent end support member 220, 222 is operative to control the rotary position of the end support members 220 and 222 with respect to a horizontal rotary axis passing through the trunnions 224 and 226. This motor, not shown, is also under the control of the system controller which is generally of the type described earlier. Accordingly, the angular disposition of the telescoping member 240 with respect to a line on the floor 206 parallel to either support member 202 or 204 is defined by the position established by the motor coupling between one travelling support 210, 212 and the respectively adjacent end support member 220, 222.

The "Y" position is established by a motor or other controllable drive (not shown) disposed on either travelling transverse support member 228 or 230 in a manner well known in the art. This motor is operative to drive the travelling transverse support members 228 and 230 back and forth over the transverse support members 216 and 218 in a direction indicated generally by the double-headed arrow 232. This motor likewise is controlled by a system controller of the type described earlier.

A further motor (not shown) is provided to pivot the outer member 234 about an axis through the two trunnions 236 and 238 which pivotally support the outer member 234 respectively on the transverse travelling support members 228 and 230. This motor controls the angular disposition of the telescoping inner member 240 with respect to the axis passing through the trunnions 224 and 226. This motor is likewise controlled by a system controller of the type described earlier.

In operation, the apparatus of FIG. 12 is capable in accordance with the invention of moving the outer member 234 both in the X and the Y direction so as to follow a path over the optical piece 200 which substantially approximates a circular spiral wherein adjacent spiral segments along a given spiral radius are separated by a common distance. This is accomplished by coupling the apparatus of FIG. 12 to a controller of the type described earlier. Further positional capability is provided by the assembly of FIG. 12 so that the outer member 234 and the telescopically fitting inner member 240 can be oriented perpendicularly with respect to the intersection of their telescoping axis and the concave upper surface of the optical piece 200. This is also accomplished by the system controller coupled thereto. In this manner, any pads 10 disposed for movement via a mechanism of the type within housing 14 of FIG. 2 mounted at the lowermost end of the inner member 240 can be positioned in flat contact with the concave upper surface of the optical piece 200 regardless of the shape of the optical surface.

The foregoing descripttion has been directed to two embodiments of the present invention as shown in FIGS. 1 and 12 and numerous alternative configurations have been suggested throughout the description in connection with certain elements. Those of ordinary skill in the art to which the invention applies will readily recognize that these and other modifications can be made to the exemplary embodiments described above without departing from the spirit and scope of the invention as defined in the following claims.

What is claimed is:

1. An apparatus for polishing or grinding an optical surface comprising, in combination:
   at least one polishing pad;
   a pad drive means coupled to each said pad for maintaining each said pad in contact with the surface being polished or ground and moving each said pad relative to the surface being polished or ground so that a removal profile is produced having circular symmetry with peak removal at the center of pad movement and minimal removal at the extremes of pad movement; and a position drive means coupled to said pad drive means to move said pad drive means along a contour path, said contour path having adjacent path segments that intersect any given contour radius extending from the contour center to the contour perimeter at a constant distance from each other.

2. The apparatus of claim 1 wherein said pad drive means comprises means to rotate said pads about a pad rotation axis which itself is rotated about a second axis which passes through said contour path.

3. The apparatus of claim 1 wherein said pad drive means includes a reciprocating drive to reciprocate the pads relative to said contour path.

4. The apparatus of claim 2 wherein each said pad is positioned so that no portion thereof intersects said pad rotation axis.

5. The apparatus of claim 1 wherein said position drive means is operative to dynamically adjust the speed of movement of said pad drive means along said contour path to a predetermined speed as a function of the position of said pad drive means relative to the surface being polished.

6. The apparatus of claim 1 wherein said pad drive means includes means to maintain constant pressure contact between each said pad and the surface being polished or ground.

7. The apparatus of claim 1 wherein said position drive means includes position sensing means to continually sense the position of said pad drive means and additionally includes speed control means to control the speed of said pad drive means along said contour path.

8. Apparatus for polishing or grinding an optical surface comprising, in combination:
at least one polishing pad;
a first rotational drive means with a first rotational axis oriented substantially perpendicular to the surface being polished, said first rotational drive means being coupled to each said polishing pad so that each said polishing pad has its center disposed in a position displaced from said first rotational axis to permit rotation of said pads about said first rotation axis by said first rotational drive means while in contact with the surface being polished or ground;
a second rotational drive means with a second rotation axis parallel to and displaced from said first rotation axis, said second drive means being coupled to said first rotational drive means to revolve said first rotational drive means about said second rotation axis;
a position drive means coupled to said second rotational drive means to move said second rotational drive means along a contour path having adjacent path segments intersecting any given contour radius extending from the contour center to its perimeter which are spaced from each other by a constant distance.

9. The apparatus of claim 8 wherein each said pad is disposed in a position where no portion thereof intersects said rotation axis.

10. The apparatus of claim 8 wherein said position drive means is operative to dynamically adjust the speed of movement of said support means along said contour path as a function of the position of said support means relative to the surface being polished or ground.

11. The apparatus of claim 8 wherein said rotational drive means includes a pad support means for supporting one pad on one end thereof, said pad support means being adjustable in a direction generally perpendicular to a surface being polished or ground to maintain constant pressure contact between the pad and the surface being polished or ground.

12. The apparatus of claim 8 additionally including means to continuously produce location signals indicating the position of said second rotation axis and additionally including speed control means responsive to said location signals to control the speed of said rotational drive means along said contour path as a function of the location of said second rotation axis.

13. An apparatus for polishing or grinding an optical surface comprising, in combination:
at least one polishing pad;
a pad drive means coupled to each pad for moving each said pad in a manner which will produce a circularly symmetric removal profile with peak removal occurring at the center of pad movement and minimum removal at the extreme of pad movement;
a pad position drive coupled to said pad drive means for moving said pad drive means at a controllable velocity in each of two different directions;
a position sensing means for sensing the position of said pad drive means in each of said two directions;
control means responsive to said position sensing means for actuating said pad position drive as a function of the sensed position of said pad drive means to move said drive means at a predetermined velocity in each of said two different directions so that the path followed by said pad drive means is a contour path having adjacent path segments intersecting any given contour radius extending from the contour center to its perimeter which are spaced from each other by a constant distance.

14. The apparatus of claim 13 wherein each said pad includes a polishing surface and said pad drive means includes means to dispose said polishing surface in constant pressure contact with a surface to be polished or ground.

15. The apparatus of claim 14 wherein said pad disposing means includes means to position each said polishing surface in contact with and substantially parallel to a surface to be polished or ground.

16. The apparatus of claim 1 wherein said constant distance is less than one half the minimum dimension of a pad in a direction substantially parallel to the surface to be polished or ground.

17. The apparatus of claim 8 wherein said constant distance is less than one half the minimum dimension of a pad in a direction substantially parallel to the surface being polished or ground.

18. The apparatus of claim 13 wherein said constant distance is less than one half the minimum dimension of a pad in a direction substantially parallel to the surface being polished or ground.

19. A method for either polishing or grinding an optical surface comprising the steps of:
moving at least one pad having a maximum dimension of no greater than 10% of the minimum dimension of the surface to be polished or ground while in contact with the optical surface to be polished or ground with a pad mover in a circularly symmetric motion which creates maximum surface removal substantially at the center of pad movement and minimum surface removal at the extreme of pad movement where the pad movement created thereby covers less than about 10% of the surface to be polished or ground;

directing the pad mover along a contour path over the surface to be polished or ground so that the center of pad movement follows the contour path and adjacent path segments intersecting any given radius from the center to the perimeter of the surface to be polished or ground are spaced apart by a constant distance less than the distance between the center of pad movement and the extreme of pad movement.

20. The method of claim 19 additionally including the step of controlling the speed of movement along the contour path of the pad mover so that surface removal at different positions on the surface to be polished or ground can be selected.

21. An apparatus for polishing or grinding an optical surface comprising, in combination:

at least one polishing pad;

means for moving each said pad with respect to and in contact with the optical surface being polished or ground to produce a circularly symmetric surface removal profile with maximum removal at the center of pad movement and minimum removal at the extreme of pad movement; and means for directing said pad moving means so that the center of pad movement moves along a contour path with adjacent contour path segments intersecting any given radius extending from the center of the surface being polished or ground to the perimeter thereof such that adjacent contour path segments are spaced apart by a constant distance smaller than the distance between the center of the pad movement and the extreme of pad movement.

* * * * *